United States Patent [19]
Fürstenau

[11] Patent Number: 5,910,840
[45] Date of Patent: Jun. 8, 1999

[54] APPARATUS AND METHOD FOR INTERFEROMETRIC MEASUREMENTS

[75] Inventor: Norbert Fürstenau, Braunschweig, Germany

[73] Assignee: Deutsche Forschungsanstalt fur Luft-und Raumfahrt e.V., Germany

[21] Appl. No.: 08/892,055

[22] Filed: Jul. 14, 1997

[30] Foreign Application Priority Data

Jul. 12, 1996 [DE] Germany .......................... 196 28 200

[51] Int. Cl.$^6$ .................................................. G01B 9/02
[52] U.S. Cl. .......................................... 356/351; 356/364
[58] Field of Search .................... 356/345, 351, 356/346, 364, 419

[56] References Cited

U.S. PATENT DOCUMENTS

| | | | |
|---|---|---|---|
| 4,708,475 | 11/1987 | Watson | 356/417 |
| 5,223,911 | 6/1993 | Suchoski, Jr. et al. | 356/350 |
| 5,675,415 | 10/1997 | Akatsu et al. | 356/364 |

FOREIGN PATENT DOCUMENTS

| | | |
|---|---|---|
| 27 31 775 A1 | 7/1977 | Germany . |
| 38 11 178 A1 | 3/1988 | Germany . |
| 36 45 238 C2 | 11/1996 | Germany . |
| 2 145 237 | 3/1985 | United Kingdom . |

OTHER PUBLICATIONS

Katherine Creath, Appl. Optics 26, 2810 (1987).
Peter de Groot and Stanley Kishner, Appl. Optics 30, 4026 (1991).
D.A. Jackson, Meas. Sci. Technol. 5, 621 (1994).

*Primary Examiner*—Frank G. Font
*Assistant Examiner*—Tu T. Nguyen
*Attorney, Agent, or Firm*—Salter & Michaelson

[57] ABSTRACT

A light source supplies light to an interferometer or polarimetric sensor and a beam divider divides the emerging light into two or more beam paths. Interference filters having different central wavelengths are provided in the beam paths and can be used to bring the two uncoupled interference signals into quadrature, e.g. by suitable adjustment of the tilting angle. In each beam path, a measuring device for quantitatively measuring the received light is disposed, and the data from the measuring devices are supplied to a data-processing device.

14 Claims, 5 Drawing Sheets

APPARATUS AND METHOD FOR INTERFEROMETRIC MEASUREMENTS

BACKGROUND OF THE INVENTION

The invention relates to a device and a method for making interferometric measurements.

Interferometric and polarimetric sensors have output signals in which there is a $\sin^2$ and $\cos^2$-dependent variation of the phase difference between the measured light wave and the reference light wave, induced by the measured quantity. The signals are therefore non-linear and periodic, which makes evaluation difficult.

For this reason, special opto-electronic methods are used to obtain a linear, unambiguous relation between the measured quantity on the one hand and the interference signal on the other hand.

Fiber-optic interferometric sensors have to be read out by special demodulating methods for stabilising the working point when reading out small signals and for obtaining precision and the sign of the change in the measured value in the case of large phase shifts. This is necessary because the periodic interference signal is subject to facing as a result of temperature drift in the case of small signals. At maximum and minimum intensity the measured signal vanishes. Another effect of periodicity at large phase shifts is an ambiguity of the output signal with respect to the sign. A photodiode connected to the interferometer output for further electronic processing records the same light/dark change irrespectively of the direction of the change in the measured quantity. Numerous attempts at solving this problem have already been made, e.g. by simultaneous use of two light sources with different wavelengths, suggested e.g. by Peter de Groot and Stanley Kishner, "Synthetic wavelength stabilisation for two-color laser-diode interferometry", in APPLIED OPTIC 30 (1991) 4026–4033. When, in the cited proposed system, the signal determined at one wavelength $\lambda_1$ has drifted to the minimum sensitivity, the signal determined at the second wavelength $\lambda_2$ is exactly at the point of maximum sensitivity for small signals. A suitable combination of the two outputs or a periodic change-over between the two wavelengths can be used e.g. for the purpose of carrier-frequency modulated phase measurement and for a read-out free from signal fading and/or with the correct sign. The difference in wavelengths has to be adjusted in each case at a special sensor so that the phase difference between the two intereference signals is exactly 90° ($\pi/2$). This results in so-called quadrature signals:

$(1-\cos\Phi(\lambda_1))$, $(1-\sin\Phi(\lambda_2))$.

The disadvantage of this idea is the relatively high cost, due to use of two light sources and the associated operations.

For completely different purposes in microscopes, Katherine Creath, "Step height measurement using two-wavelength phase-shifting interferometry", in APPLIED OPTICS 26 (1987), 2810–2816 proposes changing the filters used manually in the case of wide-band white light for the purpose of interferometry at two wavelengths. This is impracticable and does not result in usable evaluating systems, and there are higher-order effects.

SUMMARY OF THE INVENTION

The object of the invention therefore is to provide a less expensive method of interferometric measurements but still using the advantages of two-wavelength interferometry.

The measurements in question are made with microinterferometers (=optical path difference of a few to a few tens of $\mu$m between the measured and the reference light wave).

According to a first aspect of the present invention, there is provided a device for making interferometric measurements, having a single light source, an interferometer or polarimetric sensor supplied with light from said light source, a beam divider, said beam divider dividing the light delivered by said interferometer or polarimetric sensor into two or more beam paths, a filter having a different central wavelength in each respective beam path, a measuring device in each respective beam path for quantitatively measuring received light and producing data therefrom, and a data-processing device, supplied with said data from the measuring device.

According to a second aspect of the present invention, there is provided a method of making interferometric measurements wherein light from a single light source is conveyed to an interferometer or polarimetric sensor, light delivered by the interferometer is divided into two or more beam paths, the divided light in each said beam path is filtered at different central wavelengths, and the thus-filtered light is quantitatively measured and the measurement is evaluated.

BRIEF DESCRIPTION OF THE DRAWINGS

Preferred embodiments of the present invention will now be described by way of example only, with reference to the accompanying drawings, of which.

DESCRIPTION OF THE PREFERRED EMBODIMENTS

Basically the invention provides a device comprising exactly one light source, an interferometer or polarimetric sensor supplied with the light from the light source, a beam divider which divides the light delivered by the interferometer or polarimetric sensor into two or more beam paths, a filter having a different central wavelength in each respective beam path, a measuring device in each respective beam path for quantitatively measuring the received light and a data-processing device, supplied with the data from the measuring devices.

The invention also provides a method wherein light is conveyed to an interferometer or polarimetric sensor, the light delivered by the interferometer is divided into two or more beam paths, the divided light in each beam path is filtered at different central wavelengths, and the thus-filtered light is quantitatively measured and the measurement is evaluated.

The device and method according to the invention achieve the objects thereof in a particularly inexpensive way. Instead of using two light sources as in the prior art, only one source is used, preferably a superluminescence diode (SLD). The superluminescence diode is preferably low-coherence and has a spectral line width in the range from 15 to 40 nm. The actual preferred line width depends on the wavelength.

Alternatively use can be made of an edge-emitting light-emitting diode with a spectral line width of about 100 nm.

The line width accordingly is finite. The light supplied by the light source to the interferometer, i.e. the actual sensor, having a given optical length l, and delivered therefrom is divided in a beam divider, more particularly into two beam paths. The two beam paths each receive about half the available light signal but with the complete 15 to 40 nm spectral line width as before. An interference filter is then inserted in each of the two beam paths. The two filters however have different central wavelengths. Preferably the two central or middle wavelengths are 10 nm apart and of course both within the spectral line width of the wavelength region of the light radiation leaving the superluminescence diode.

The optical length L is preferably in the range from 5 to 30 $\mu$m, particularly about 10 $\mu$m.

This means that different wavelengths now occur in each respective beam path behind the filters. These different beams, which must fulfil the quadrature condition (see hereinbefore) are then supplied to a respective measuring device in each beam path for quantitatively measuring the light therein, or strictly speaking the light received by the measuring device.

Adaptation to a sensor of optical length L is preferably made by fine adjustment, which can be made by setting the filters at a suitable tilting angle to the beam axis as explained in detail hereinafter.

The distance between the central wavelength $\lambda_1$ and $\lambda_2$, after connecting a sensor, is adjusted individually for each sensor by adjusting the filter tilting angle, so that the difference between the interference signals $1_1(\lambda_1)$, $1_2(\lambda_2)$ is exactly $\Delta\Phi_{12}=\pi/2$. The reason for this is that owing to the method of manufacture, no two sensors have exactly the same length (e.g. the distance between mirrors in Fabry-Perot interferometer sensors).

The measuring devices are preferably photodiodes, and the beam dividers can be conventional directional couplers, more particularly fibre-optic directional couplers.

A data processing device receives the quantitative measured results from the measuring devices.

Although only a single light source is used, the full possibilities of a two-wavelength method are available. Using correspondingly less space, a measurement which is at at least as reliable can be made at a considerably lower cost.

The result is a simple, inexpensive solution, using a single low-coherent superluminescence diode as the light source.

Homodyne and pseudo-heterodyne techniques can be used to determine the phase information from the two quadrature signals. The invention can be embodied by fibre-optic or by conventional "bulk optic" technology. The method is suitable both for polarimetric and for micro-interferometer (EFPI) sensors.

A typical sensor system thus comprises the actual sensor element, the polarimetric sensor or micro-interferometer with an optical path difference of around L-10 $\mu$m, and a superluminescence diode light source whose light is supplied via a fibre-optic directional coupler to a wired (mono-mode) feed fibre leading to the sensor element. The light coupled back from the sensor to the feed fibre is diverted in the coupler to a photodiode on the second input arm of the coupler, where it is converted into an electric signal for further signal processing (Fourier transformation for analysis of the vibration spectrum, filtering, threshold-value discrimination).

The detector unit is a steel plate with two diodes and upstream adjustable interference filters having different central wavelengths. In the new solution, only a single low-coherence superluminescence diode source is used, instead of the conventional use of two stabilised high-coherence laser diodes at different wavelengths.

The two wavelengths differing by about 8 to 20 nm are filtered out of the spectrum by the interference filter, in each case with a bandwidth of about 10 nm. Preferably the different central wavelengths are obtained in the two beam paths in spite of use of two filter elements of identical construction, by giving different slopes to the filter planes inside the beam path. By this means the device according to the invention can be constructed with a relatively small number of different components.

The tilting angles of the filters are preferably below 20°. Unexpectedly it has been found that the beam offset on tilting does not result in problems, as was originally feared.

Other advantages of the invention are that there is no need for the insulators normally required for suppressing back-reflections into the laser. There is also no need for the temperature stabilisation required for laser diodes, which is complicated and must be better than 0.01° K. at the required wavelength stabilities of less than 0.01 nm.

The methods of demodulating polarimetric sensors are greatly simplified by using the idea according to the invention. Instead of e.g. periodic change-overs between two laser diode light sources, with the known problems of frequency stabilisation, in the method according to the invention for generating quadrature signals the only change-over is alternately between two photodiodes, which are supplied with the two phase-shifted interference signals. Instead of changing light sources, the change-over is between sensors or receivers. The phase difference between the two interfering light waves in a two-arm interferometer or a Fabry-Perot interferometer depends on the wavelength $\lambda$ in accordance with the formula $$\Phi = 2\frac{2\pi f(n)L}{\lambda}$$

where f(n) is a function of the refractive index of the medium through which the interfering light waves propagate, and $\Phi$ is the sum of a constant component $\Phi_o$ and a usually much smaller component $\Delta\phi_m$ modulated by a measured quantity, i.e.:

$$\Phi=\Phi_o+\Delta\Phi_m$$

The preferred interferometers here are two fiber-optic variants particularly interesting in measurement technology, i.e. extrinsic Fabry-Perot microinterferometers with low finesse (i.e. with low reflectivity of the two F-P mirrors) on the one hand or polarimetric two-mode interferometers with polarisation-retaining glass fibres on the other hand.

Figure 1:
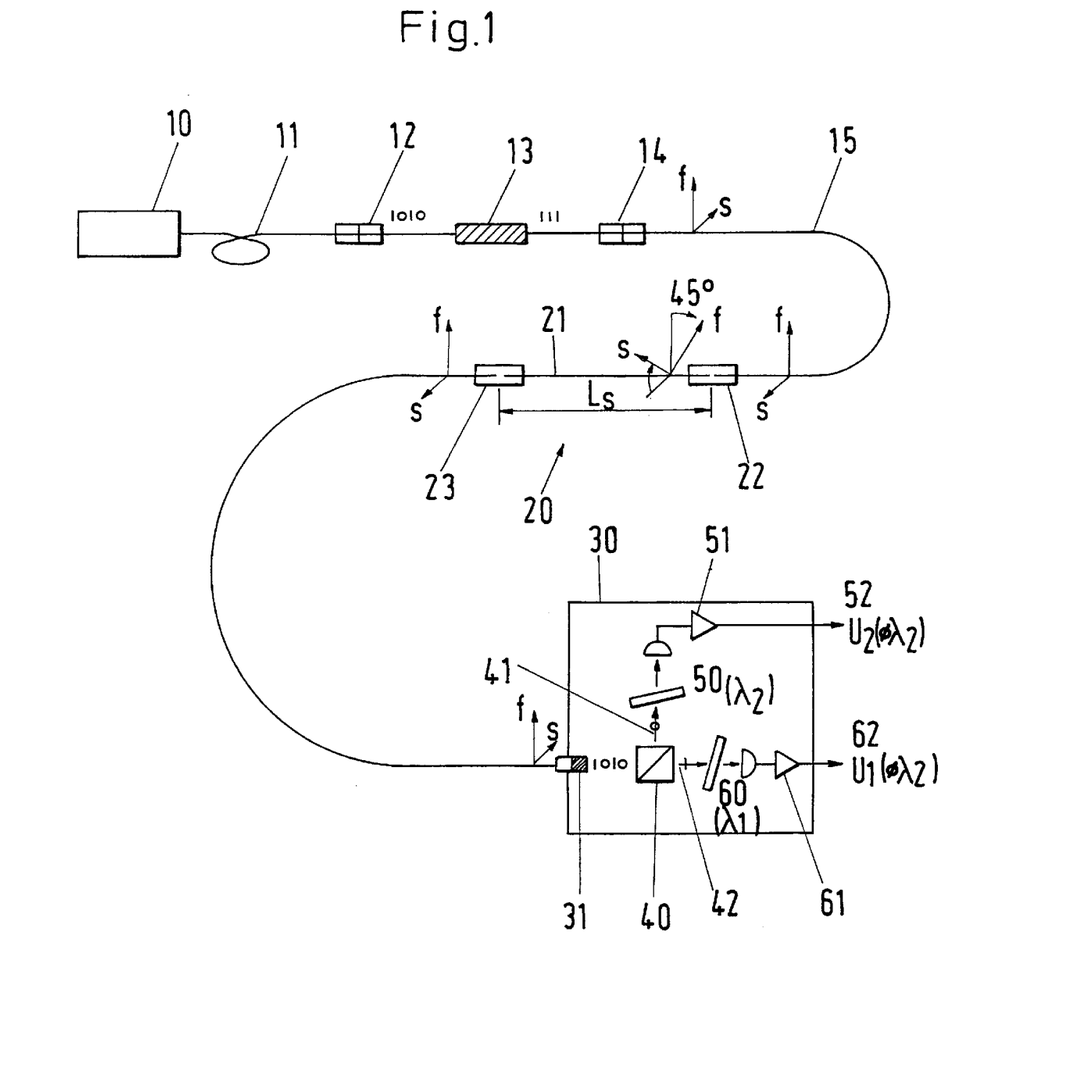
FIG. 1 shows a first embodiment of a device according to the invention.

Referring now to the drawings, FIG. 1 diagrammatically shows the structure of a complete installation. The light source 10 is a superluminescence diode in the spectral range of e.g. 330 nm. A glass fibre cable 11 extends from the light source via a monomode plug 12 to a polarizer 13 and via a second monomode plug 14 to a polarisation-retaining glass fibre 15.

The fibre 15 leads to the actual sensor 20, which comprises a polarisation-retaining sensor fibre 21 of length $L_s$, extending between two splices 22 and 23. In the sensor fibre 21 the double-retracting axes are rotated through 45° relative to the axes of the feed fibre and output fibre, as indicated in the drawing.

A decoupling unit 30 is connected to the output of the sensor 20. Leading into it is a gradient index lens 31, a collimation lens, from which the beam path leads to a (polarisation) beam divider 40. The beam divider 40 divides the light between two beam paths 41, 42, which initially still have half the radiation, the paths being qualitatively the same in others respects.

A tiltable filter 50, 60 is inserted into each respective beam path 41, 42 and has a central wavelength $\lambda_2$, $\lambda_1$ respectively. The filters 50, 60 adjacent photodiode-preamplifier combinations 51, 61 which convert the optical light intensities into electric signals. The electric signals $U_2(\Phi(\lambda_2))$ and $U_1(\Phi(\Phi(\lambda_1)))$ respectively than leave the decoupling unit 30.

The double-refracting axes, i.e. the fast (f) and the slow (s) axis of the input and output fibres 15, are rotated in the polarimetric sensor element 20 through 45° relative to the double-refracting axes of the measuring-fibre portion 21 of length $L_2$. The orthogonally polarised light wave-propagating along the f and s axes of the measuring-fibre portion 21 are superposed along the f and s axes of the polarisation-retaining output filter 15 in known manner, to obtain two interference signals which emerge with a 180° phase shift behind the (polarisation) beam divider 40.

Use of two different wavelengths $\lambda$ results in two interference signals with different phase offsets $\Phi_o$. In dependence on the optical path difference in the sensor portion, the two wavelengths $\lambda_1$ and $\lambda_2$ are chosen so that the difference between the phase offset fulfils the following quadrature condition:

$$\Delta\Phi = \Phi_1 - \Phi_2 = (2N+1)\pi/2$$

in the case where the difference in wavelength is very small, as is preferably aimed at in the invention $$\frac{\Delta\lambda}{\lambda} = \frac{(N+\frac{1}{2})\lambda}{4L}$$

is also obtained.

Figure 2:
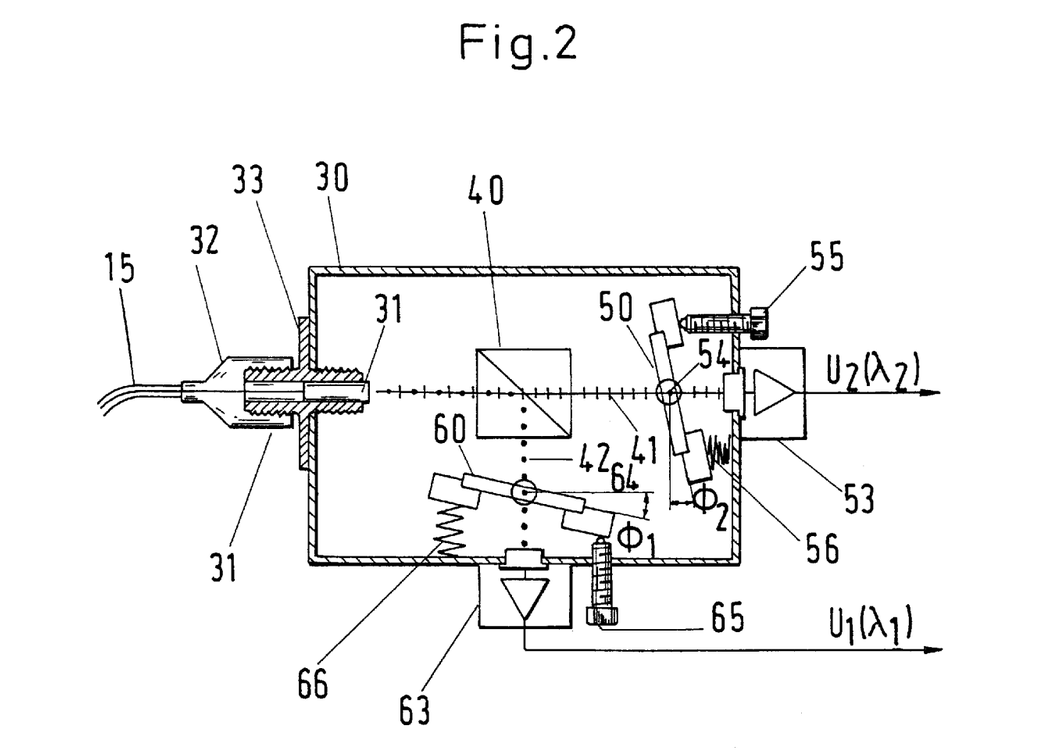
FIG. 2 is a more detailed view of a second embodiment or a device according to the invention.

In the case of a micro-ferometer with a measuring-fibre portion having the typical length of 10 micrometers and a wavelength $\lambda$ of about 1300 nm and N=0, the typical difference in wavelength is $\Delta\lambda$=16.25 nm. In the complicated known solutions using two high-coherence laser diodes, this difference in wavelength has to be adjusted to the available interferometer length in complicated manner by adjusting the laser diode current and the laser diode temperatures, whereas according to the invention the same result is obtained by using a light source in the form of a single low-coherence wide-spectrum superluminescence diode. FIG. 2 is a detailed view of a read-out unit or decoupling unit 30 as used e.g. in the embodiment in FIG. 1.

As before, a fibre 15 leads to the lens 31. As before, the entire light beam, already containing the information, leaves the lens 31; the state of polarisation (usually elliptical) is indicated by alternating dots and lines at right angles to the direction of radiation.

All this information proceeds to the polarisation beam divider 40, which on the one hand allows the information to pass through in the same direction as before (i.e. the polarisation component indicated by vertical lines) whereas it deflects the other part—indicated by dots—at right angle, i.e. downwards in this embodiment.

As before a respective filter 50, 60 is provided in both beam paths 41 and 42. These filters are adjustable. The intensities of the two light beams are converted into electric signals for further processing in photodiode-preamplifier combinations 53, 63.

The opto-electrically converted signals from detectors 53, 63 are delivered to a data-processing device (not shown here).

With regard to the details, the output fibre 15 is connected via a monomode plug 32 and an adapter 33 to the casing of the coupling unit 30. The fibre guide (ferrule) in the plug abuts the gradient index lens 31, fitted in the adapter 33, for collimating the output light beam.

After being divided in the beam divider 40, the light beam through the two filters 50 and 60 is focused as mentioned on to the photodiodes 53, 63 and the connected preamplifier. The filters 50, 60 are secured by rotary holders 54, 64 to the casing of the coupling unit 30 and are brought into the quadrature position by means of adjusting screws 55, 65 against the pressure of springs 56, 66.

In the case of a polarimetric two-mode interferometer, the analyser will be a polarisation beam divider, which breaks up the incident light into two orthogonally polarised states. The output filter 15, which maintains the polarisation in this case, must be aligned with its fast and slow axes parallel to the polarising axes of the beam divider.

Figure 3:
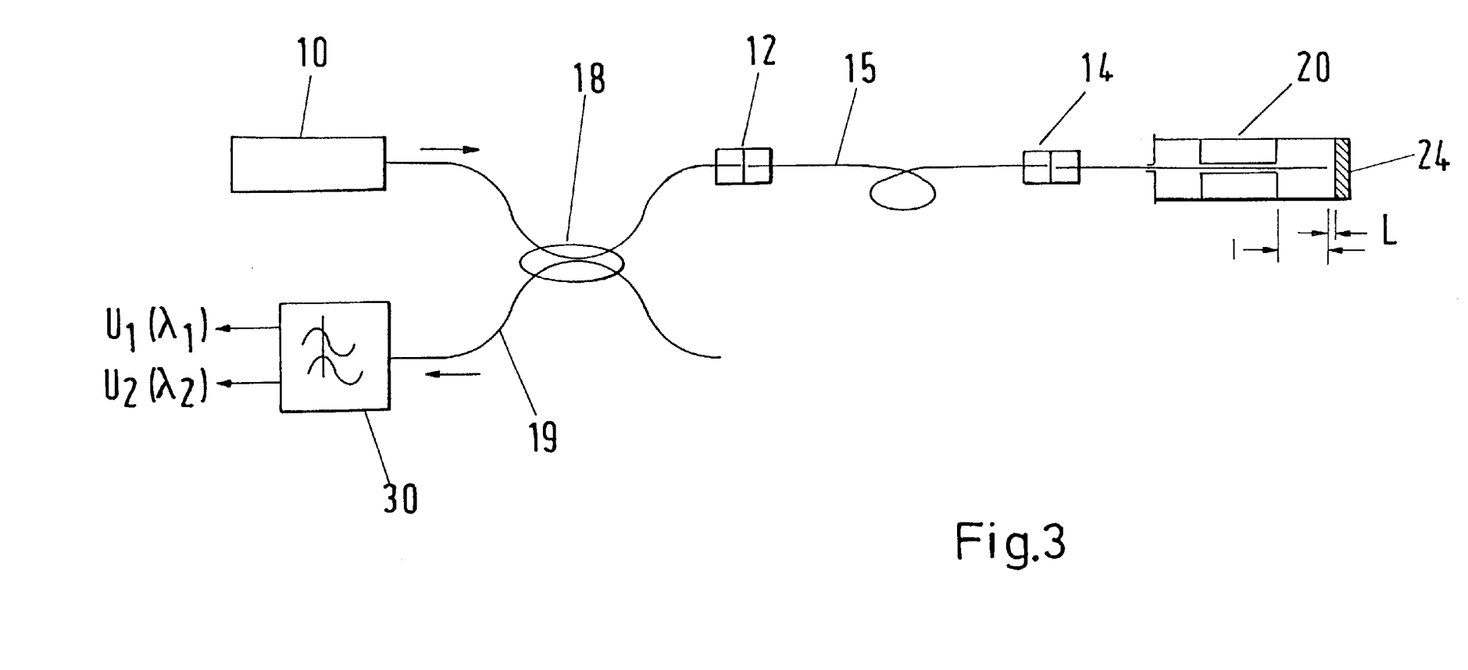
FIG. 3 is a third embodiment shown diagramatically corresponding to FIG. 1.

FIG. 3, in a diagram corresponding to FIG. 1, shows the structure of another embodiment of a device according to the invention for making interferometric measurements. A light source 10, in this case a superluminescence diode with a central wavelength of e.g. 1300 nm, supplies corresponding light with a spectral width of 40 nm. The light proceeds through a directional coupler 18, e.g. a 3-dB coupler, to a monomode plug 12 and then via a monomode feed fibre 15 and an additional monomode plug 14 to the interferometer 20.

This interferometer 20 is here a fibre-optic extrinsic Fabry-Perot interferometer having a resonator length L. It can e.g. be a vibration sensor according to the subsequently published DE 195 14 852 A1. The second mirror in this interferometer 20 is additionally marked 24. The first mirror is embodied by the flat fibre end surface, with 4% reflectivity.

The beam path then runs from the mirror 24 of the interferometer 20 back via the monomode plug 14, the fibre 15 and the monomode plug 12, to the directional coupler 18, where the beam path is decoupled in a return-line fibre 19 leading to a decoupling unit 30.

Figure 4:
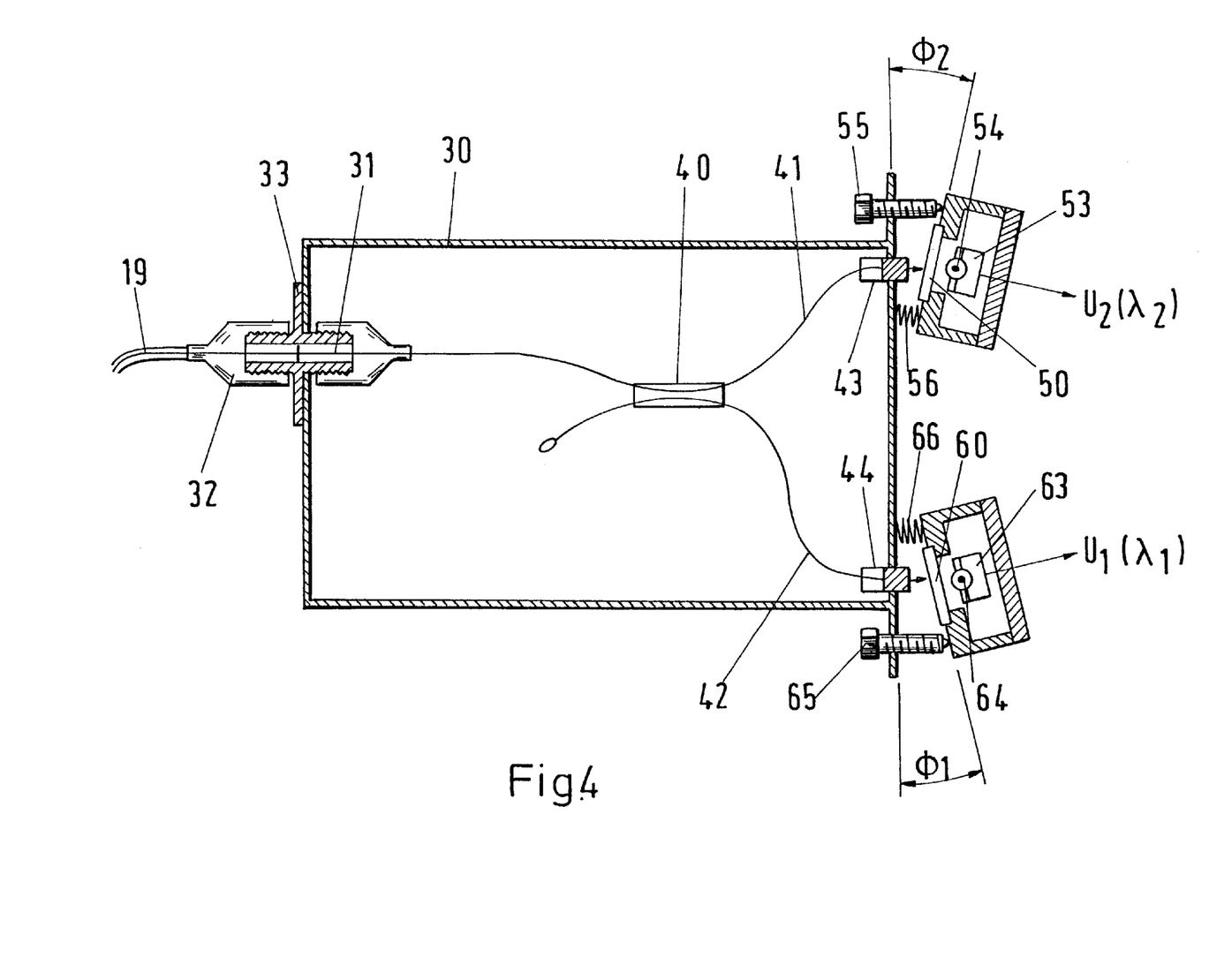
FIG. 4 is a fourth embodiment, in a view corresponding to FIG. 2.

The decoupling unit 30 is shown in detail in FIG. 4, although a different combination of the embodiments is possible.

FIG. 4, corresponding to FIG. 2, shows a form of decoupling unit 30 as used e.g. in an embodiment according to FIG. 3. In this case likewise, the fibre 19 leads to a monomode plug 30 secured by an adapter 33 to the decoupling unit 30 or its casing.

In the present case a beam divider 40 in the form of a fibre-optic directional coupler, i.e. a 3 dB coupler, is provided inside the decoupling unit 30. As before, the directional coupler divides the beam into two beam paths 41 and 42. The gradient index lenses 43, 44 are provided and as before the beam paths 41, 42 emerge via the lens 43, 44 from the casing of the decoupling unit 30 and deliver the light to two filters 50, 60 disposed directly in front of two measuring units 53, 63 which are photodiodes as before.

The two filter-detector combinations 50/53 on the one hand and 60/63 on the other hand are secured by respective rotary holders 54, 64 to the casing of the decoupling unit 30 and are brought into the quadrature position by adjusting screws 55, 65 against the pressure of springs 56, 66.

An interferometer must be imagined as before in front of the fibre 15, wherein two phase-shifted interference signals are generated by the two interference filters, having suitably chosen central wavelengths $\lambda_1$, $\lambda_2$ and suitable tilting angles $\theta_1$, $\theta_2$, from the incident rays in the beam paths, the interference filters being disposed between the two photodiodes and a beam divider, which in this case is in the form of a fibre-optic directional coupler at the interferometer output.

Since different sensors can be connected to a 2-$\lambda$ read-out unit, it is impracticable to provide filters with individually adjusted wavelengths $\lambda_1$, $\lambda_2$, as required for fulfilling the quadrature condition, for each individual interferometric sensor element and with the given manufacturing tolerances regarding the length L. In this case however a solution has been found, using filters with standard $\lambda$-gradation. This solution uses the dependence of the filter central wavelength on the angle of incidence $\theta$ of the light beam. The following relation applies (for $\theta$ less than 15°);

$$\lambda_o = \lambda_o \sqrt{1 - (n_o/n^\Phi)\sin^2\theta}$$

When $\lambda_o$=1300 nm, $n_0$=1 and n°=2.05, the following table of values is obtained:

| $\Theta/°$ | 5 | 10 | 15 |
|---|---|---|---|
| $\lambda_\Theta$/nm | 1298.8 | 1295.3 | 1289.6 |

Accordingly, within the standard filter gradations obtainable from the manufacture, it is possible to fine-tune the difference in wavelength in order to set the quadrature condition by slightly tilting the filters. As FIGS. 3 and 4 show, the filters can be disposed in separate tilting devices between the beam divider and the photodiodes.

In tilting devices of this kind, the centre of rotation should preferably be along the axis of the light beam or the beam path. Another alternative is to connect the filter permanently to the photodiodes as indicated in FIG. 4, and to tilt the entire filter-photodiode combination. The centre of rotation should then lie in the surface of the photodiode.

Another alternative possibility is to construct the beam dividers 40 either in a conventional optical system (FIG. 2) or as fibre-optic 3-dB directional coupler (FIG. 4). In order to focus the light beam on the photodiodes, the light emerging from the fibres is collimated by gradient index lenses (bar lenses). These are connected either to the output fibres in front of the beam-divider cube (FIG. 2) or to the output arms of the coupler (FIG. 4). In the case of polarimetric two-mode interferometers, either a polarisation beam divider (FIG. 2) or a polarisation-dividing coupler (FIG. 4) is used, the polarizer axes being aligned in conventional manner parallel to the double-refracting axes, i.e. the fast (f) and the slow (s) axis of the input and output phases. The two orthogonally polarised interference signals are divided by the polarisation beam divider in the quadrature read-out unit and, corresponding to FIG. 2 or 4, are delivered by the two different interference filters 50, 60 to the photodiodes 53, 63. By tilting the interference filters, the phase shift between the signals $l_1$ and $l_2$ can now be converted from 180° to the value of 90° or 270° required for signals in quadrature. This means that $l_1$ and $l_2$, in the case of a polarimetric two-mode interferometer, are transformed by the filters to the quadrature signals $l_1$ and $l_2$.

Figure 5:
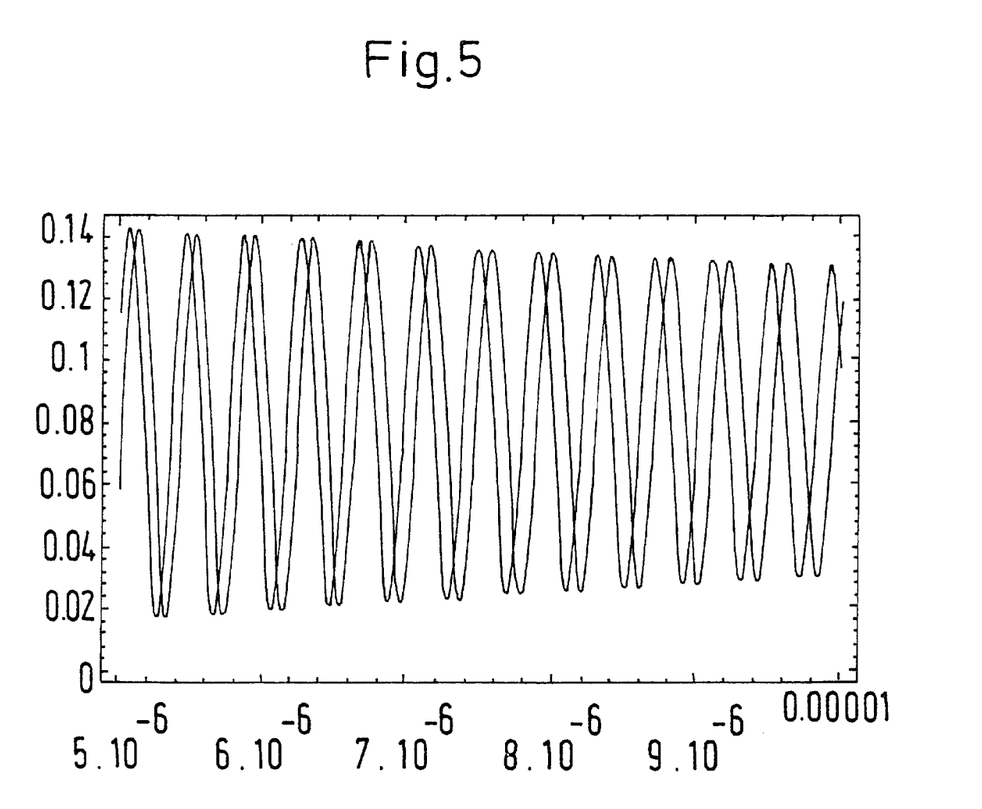
FIG. 5 is a numerical evaluation for two wavelengths.

For the purpose of incremental signal read-out via interference-strip counting (at large phase shifts >>$2\pi$), the quadrature signals are delivered immediately, optionally after suitable amplification, to the quadrature inputs of a reversible counter. In the case of fixed filter angles $\Theta_1$ and $\Theta_2$ the quadrature condition is fulfilled only for the inoperative phase $\Phi_o$ (interferometer length $L_o$). Since the quadrature condition depends on L, the phase difference $\Delta\Phi_{12}=\Phi_1-\Phi_2$ varies with the change in L induced by the measurement as follows:

$$\Delta\Phi_{12} = 2\frac{2\pi\Delta\lambda f(n)}{\lambda_1\lambda_2}L$$

as shown hereinafter with reference to FIG. 5.

FIG. 5 is a graphic view of the intensities $l_1$ and $l_2$ for two different but neighbouring wavelengths $\lambda_1$ and $\lambda_2$. These intensities are normalised and plotted as a function of the length L (in meters) i.e. as a function of the length L in the Fabry-Perot interferometer in FIG. 3.

The decrease in amplitude with L results from the dependence of the interference contrast $\mu$ on the spectral line width, which is selected here at $\delta\lambda$=10 nm.

As can be seen, FIG. 5 shows the gradual displacement of the two interference signals relative to one another.

The phase difference between the quadrature signals varies more slowly with L, by the factor $\Delta\lambda/\lambda$, than the phase $\Phi$ of the individual interference signal. In the case of simultaneous measurement to supplement the high-resolution incremental read-out, the phase difference can be used as a measure of the absolute phase position, and hence for initialising the interferometer.

At small phase shifts the quadrature signal can be additionally processed to obtain the desired phase information, which is proportional to the measured quantity or the alteration therein. One example is a combination of the measured differential changes in intensity as per:

$$d\Phi = \sqrt{dl_2^2 + dl_2^2/1_n}$$

One interesting feature of the method according to the invention is that the phase shift (the phase offset) can be adjusted between two interference signals $l_1(\lambda_1)$, $l_2(\lambda_2)$: $\Delta\Phi_{12}$-$\Phi_1$, $\Phi_2$, in such a way that, in the case of sensors having a different optical sensor length L (=Fabry-Perot distance between mirrors) and connected to the read-out unit, the quadrature condition $\Delta\Phi_{12}$=90° can be re-set in each case. It could not be anticipated that this would be possible for the given sensor-length ranges via tilting angles $\Theta$<20° or even <15°.

Consideration should be given to the beam-offset effect, which also depends on the filter parameters, particularly their thickness. At the said optical length of L=5 to 30 $\mu$m, however, the spectral width of the superluminescence diode and the area of the diode are each that an angular range of less than 20° is sufficient to maintain the quadrature condition of $\Delta\Phi$=$\pi$/2.

It will be understood that the above description of the present invention is susceptible to various modifications, changes and adaptations.

What is claimed is:

1. A device for making interferometric measurements, having a single high power, low coherence, wide bandwidth light source, and an interferometer or polarimetric sensor supplied with light from said light source, a beam divider, said beam divider dividing the light delivered by said interferometer or polarimetric sensor into two or more beam paths, a filter having a different central wavelength in each respective beam path, a measuring device in each respective beam path for quantitatively measuring received light and producing data therefrom, and a data-processing device, supplied with said data from the measuring device.

2. A device according to claim 1, wherein said light source is a superluminescence diode or edge-emitting light-emitting diode.

3. A device according to claim 2, using a low-coherence superluminescence diode having a spectral line width between 15 and 40 nm.

4. A device according to claim 2, using an edge-emitting light-emitting diode having a line width of about 100 nm.

5. A device according to claim 1, wherein said central wavelengths of said filters in said beam paths differ by about 8 to 20 nm.

6. A device according to claim 1, wherein said filters in said beam paths have different central wavelengths as a result of a different slope of the filter planes.

7. A device according to claim 6, wherein the tilting angle of said filters in less than 20°.

8. A device according to claim 6, wherein the slope of said filter planes is adjustable.

9. A device according to claim 7, wherein the slope of said filter planes is adjustable.

10. A device according to claim 1, wherein said measuring devices are photodiodes with preamplifiers.

11. A device according to claim 1, wherein said beam divider is a fibre-optic directional coupler, particularly a 3-dB coupler.

12. A device according to claim 1, wherein the optical length of said interferometer is between 5 and 30 $\mu$m.

13. A device according to claim 12, wherein the optical length of said interferometer is about 10 $\mu$m.

14. A method of making interferometric measurements wherein light from a single high power, low coherence, wide bandwidth light source is conveyed to an interferometer or polarimetric sensor, light delivered by the interferometer is divided into two or more beam paths, the divided light in each said beam path is filtered at different central wavelengths, and the thus-filtered light is quantitatively measured and the measurement is evaluated.

* * * * *